(12) United States Patent
Wilson

(10) Patent No.: US 6,991,216 B1
(45) Date of Patent: Jan. 31, 2006

(54) VALVE

(75) Inventor: Steve B. Wilson, Vivian, LA (US)

(73) Assignee: Inferno Manufacturing Corporation, Shreveport, LA (US)

( * ) Notice: Subject to any disclaimer, the term of this patent is extended or adjusted under 35 U.S.C. 154(b) by 120 days.

(21) Appl. No.: 10/460,542

(22) Filed: Jun. 12, 2003

(51) Int. Cl.
*F16K 41/00* (2006.01)

(52) U.S. Cl. ............... 251/214; 251/218; 251/223; 251/264; 251/267; 251/274

(58) Field of Classification Search ............... 251/214, 251/215, 218, 221, 223, 225, 264, 266, 267, 251/273, 274
See application file for complete search history.

(56) References Cited

U.S. PATENT DOCUMENTS

| | | | |
|---|---|---|---|
| 368,073 A | 8/1887 | Convert | |
| 974,498 A | 11/1910 | Kerbaugh | |
| 2,177,888 A | 10/1939 | Huff | 251/27 |
| 2,982,512 A | 5/1961 | Hurley | 251/77 |
| 3,976,279 A | 8/1976 | Walker | 251/267 |
| 4,114,851 A * | 9/1978 | Shivak et al. | 251/88 |
| 4,272,055 A | 6/1981 | Herd | 251/214 |
| 4,630,629 A * | 12/1986 | Nimberger | 137/15.24 |
| 4,750,709 A * | 6/1988 | Kolenc et al. | 251/335.2 |
| 4,844,411 A | 7/1989 | Nelson | 251/214 |
| 4,860,784 A * | 8/1989 | Petersen et al. | 137/315.28 |
| 6,148,841 A | 11/2000 | Davidson | 137/68.23 |

OTHER PUBLICATIONS

Brochure of Inferno Manufacturing Corporation, Liquid Level Gages, 2001, pp. LG1-LG6.
Inferno Mfg. Corp. Bulletin FL (Aug. 2001).
High Pressure Equipment Company, Valve Features.
Penberthy, Technical Data Series 700, Valves for Flat Glass Gages, 1996 Penberthy, Section 2000, Bulletin 2235, Issued Sep. 1996, Replaces May 1987.
Penberthy, Valves (Gage Cocks): Flat Glass Tubular Glass, Valves Overview, 1997, pp. 20-24, 26-31.
Strahman Vales, Inc., Liquid Level Gauges.
Swagelok, Nupro Company, JN Series Screwed Bonnet Needle Valves, Catalog MS-01-85, 1987, 1993, 1995, 1997. Contents, p. 2.

* cited by examiner

*Primary Examiner*—J. Casimer Jacyna
(74) *Attorney, Agent, or Firm*—Fellers, Snider, Blankenship, Bailey & Tippens, P.C.

(57) ABSTRACT

A valve, such as a liquid level sight glass gage valve, has a valve unit and a passageway that extends through the valve unit. The passageway has a stem receiving area, a seal receiving area, and a bonnet receiving area that has a non-circular inner perimeter. A packing assembly is provided to isolate the bonnet receiving area from the fluid path. A bonnet is located within the bonnet receiving areas and has a non-circular outside surface for mating relationship with the non-circular inner perimeter of the valve unit. A valve stem is in sealing relationship with the packing assembly and selectively engages a valve seat. The stem threadably engages the bonnet. A bonnet nut is threadably received on the valve unit for securing the bonnet within the valve unit and allowing axial movement of the bonnet against the packing assembly, thereby effecting compression of the packing.

17 Claims, 6 Drawing Sheets

VALVE

FIELD OF THE INVENTION

The present invention is directed toward a valve. More particularly, but not by way of limitation, the present invention is directed towards an improved valve that resists freeze up due to internal corrosion or fouling of the valve mechanism.

BACKGROUND OF THE INVENTION

Sight glass liquid level gages have a vertical window that allows the level of a liquid in a vessel to be determined. Level gages are selectively isolated from vessel contents by valves to enable removal of a level gage for cleaning or repair without dumping the contents of the vessel. Liquid level gage valves are used in pairs, one on each end of a level gage. Typically, liquid level gage valves have a safety ball check that functions to quickly seat and prevent the vessel from emptying in the event of a break of the gage glass. Gage glass breakage will result in a sudden drop in pressure across the gage valve, which seats the safety ball. The valve may then be manually closed and the gage repaired. In a typical gage valve, closing of the valve causes a small extension on the bottom end of the stem to dislodge the seated check ball from the seat, thereby reestablishing communication between the vessel and the gage. The valve may then be fully opened to its normal position. Another feature common to liquid level gage valves is an offset of the gage connection. The offset feature facilitates cleaning of the gage glass by allowing a brush or swab to pass through the valve body and into the gage glass chamber once the vent and drain plugs are removed.

A problem common to standard valves is the fact that internals of the valves are in constant contact with the liquid of the vessel. The liquid can be very corrosive and may contain suspended particles. Since the valves are normally open, swelling associated with corrosion and/or suspended particles tend to collect and pack in the stem thread area, which can cause the valve to "freeze up" and become impossible to close.

Attempts have been made to overcome stem thread area corrosion issues, such as locating valve packing at a place between the liquid and the threads so that the threads are located on the exterior of the valve. An example is an OS & Y valve, the letter designation standing for outside screw and yoke. However, such solutions have created additional problems by exposing the stem threads to the surrounding environment, which can be problematic. For example, an inadvertent blow to the stem can cause bruising or bending of the stem, making the valve difficult or impossible to close. Additionally, dirt and other debris are attracted to lubricants that are used on the threads and this may result in difficulty operating the valve. Furthermore an OS & Y valve usually employs a bolted bonnet that must attach and seal to the body. The bolted bonnet requires an additional seal, which adds to manufacturing and maintenance costs.

Some instrument needle valves use the stem packing to isolate the stem threads from the internal fluid with an inside screw (instead of an outside screw) whereby the stem threads are located internal to the valve body. These valves employ a dual acting bonnet, which is threaded internally to accept the valve stem. Also, the bonnet may be axially adjusted to compress a packing ring. A drawback associated with such needle valves is that the needle valves employ a bonnet that is threaded externally to fit internal threads in the valve body. A locking mechanism, usually a jam nut, must be used to lock the bonnet into a fixed position with respect to the valve body after an adjustment to the compression packing has been made. Therefore, to tighten the packing, an operator must first loosen the jam nut. The loosening of the jam nut may not be obvious to an operator who normally tightens the packing on a leaking valve by one action only, i.e., tightening a packing nut. The non-intuitive aspect of first being required to loosen part of the valve before compressing of the packing is a disadvantage associated with this valve.

Another design weakness associated with using a rotating bonnet on a needle valve is revealed when a jam nut is left in a loosened condition, e.g., after a tightening sequence on the packing is performed. If the jam nut is left loose, then the next time an operator begins to unscrew the valve into a fully open position, a major diameter or flange that creates the back seat of the stem will rotate backwards until it bears against the inboard end of the bonnet. At this point, further backward rotation of the stem will cause the bonnet to unscrew from the valve body, which results in a possibly dangerous scenario that should be avoided. For this reason it is common to use a staking device or a secondary locking device to restrain movement of the bonnet. Use of a staking device or a secondary locking device is inconvenient because the device must first be removed before the packing can be tightened. Once such a device is removed the manufacturer has no assurance that it will be replaced.

Finally, another way to accomplish an isolation of the stem threads from fluid is to provide an O-ring seal between the diameter of the stem and the seal receiving area of the body. By using an O-ring around the stem instead of compression packing, the design may be greatly simplified because it is not necessary to provide a means of compressing the packing below the stem threads. However, this valve design is only as good as the seal. In a dirty fluid environment, such as oil and gas production, it is likely that a soft seal such as an elastomeric O-ring may become damaged by sharp angled debris such as rust, scale and sand. Axial and rotational movement of the stem as it travels between an open and closed position may pick up contaminants and drag them across the seal, causing cuts to the O-ring and consequent leakage.

In operation a certain amount of torque is required to turn a valve stem. The required torque creates the "feel" that a user experiences when opening or closing the hand wheel of the valve. Resistance to turning is caused by friction between the seal and the stem, by friction of the mating threads, and by hydraulic force internal to the valve body that acts against the stem.

If the valve utilizes an O-ring seal, then frictional resistance caused by the seal is typically low. If the valve utilizes compression packing for the seal then the seal friction is much greater and varies in proportion to the load imposed by a packing or stuffingbox nut. Some packing materials, such as Teflon®, will seal against the valve stem with relatively low loads but other materials, such as flexible graphite, require more significant stuffingbox loads.

As the valve stem advances into the valve body from an open position to a closed position, the stem rotates and travels axially through the seal area. The axial movement of the valve stem is resisted by internal hydraulic forces inside of the valve body. The force required to advance the stem is equal to the cross sectional area of the stem in the region of the packing run multiplied by the pressure. Thus, it can be seen that the force required to advance the stem against pressure can be lowered by making the seal diameter of the stem smaller for a given pressure condition. Therefore, it is advantageous to make the seal diameter of the stem as small as practical.

The valve stem has a threaded portion. The screw threads on the stem form an inclined plane and offer a mechanical advantage to overcoming the hydraulic force internal to the valve. A larger screw thread diameter produces a lower helix angle and therefore confers more advantage than a smaller thread diameter.

In a conventional valve the area of the stem between the threads and the hand wheel contains the stem seal. The area of the stem between the threads and the handwheel usually extends some distance past the outside of the packing or stuffingbox nut before it terminates at the hand wheel. The portion of the stem extending past the outside of the packing nut allows the handwheel to be separated from the rest of the valve, which permits the operator to grasp the hand wheel and turn it without scraping his knuckles on the valve body or adjacent piping. In the case of a gage valve of the type typically used with a liquid level gage, the hand wheel might be positioned not only over the valve body but also over a portion of the level gage. The handwheel should be positioned far enough from the valve to avoid interference between the hand wheel and the level gage. Thus, there must be sufficient extension of the stem to allow adequate clearance between the hand wheel and the valve for manual operation of the hand wheel. A second reason for an extended stem is to allow for placement of thermal insulation directly over the valve and still allow for operation of the hand wheel.

Since the extended stem is subject to damage, a manufacturer typically makes the stem of sufficient diameter to resist bending if the valve is dropped during installation or bumped sideways on the hand wheel during shipping, installation or operation. Additionally, a valve will sometimes "freeze" into position after a period of inactivity. A frozen valve often requires turning with a valve wrench. The valve wrench can impose severe torque on the hand wheel. If the stem diameter is too small then it can be twisted apart.

SUMMARY OF THE INVENTION

It is desirable to provide a valve that protects the threads of the valve stem from the corrosive effects of vessel fluids and that protects the valve stem from potential damage. By locating the valve stem packing between the liquid in a valve unit and the stem operating threads, problems associated with corrosion swelling and the collection of suspended particles on the operating threads are eliminated. For purposes of this application, "valve unit" shall be used to refer to a valve assembly, which may be of a unitary body design or may be of multi-piece construction, e.g. a valve body and an attachment, or other variations, including in-line, straight pattern configuration, and angled valve configurations.

A seal located at the end of the bonnet prevents outside contamination from entering the operating thread area. The seal also may contain lubricant necessary for the operation of the close fitted thread. The valve of the invention has the operating threads and a large percentage of the stem confined in the valve unit, thereby eliminating the yoke. Additionally, the valve of the invention has a dual acting bonnet. The bonnet not only carries the stem but also provides a means of selectively compressing the packing by axial forces.

More particularly, the valve of the invention includes a valve unit having a first end and a second end. A passageway extends from the first end to the second end of the valve unit. The passageway has a stem receiving area, a seal receiving area, a first bonnet receiving area and a second bonnet receiving area. The second bonnet receiving area has a non-circular inner perimeter. One or more outlet passageways are in communication with the passageway. A packing member is located in the seal receiving area of the passageway.

A bonnet is located within the bonnet receiving area of the body. The bonnet has a first end and a second end and a non-circular external area proximate the first end of the bonnet for mating relationship with the second bonnet receiving area of the body. The mating non-circular areas of the bonnet and of the interior surface of the body facilitate a non-rotating connection. The bonnet is dual acting. The bonnet is threaded internally to accept a stem. The bonnet also slides axially in the valve body as the bonnet nut is tightened. The sliding movement allows the end face of the bonnet to bear against a packing member or a packing follower, thus accomplishing compression of the packing. As the stem is turned the bonnet is prevented from turning with it by the non-circular fit between the bonnet and the valve body. The bonnet may thus be described as non-rotating and dual acting.

A valve stem is located in the passageway in sealing relationship with the packing member. The valve stem is threadably engaged with the bonnet. A bonnet nut is threadably received on external threads on the second end of the body. The bonnet nut is for securing the bonnet in the body.

A valve stem having an optimal design has a relatively small sealing diameter while the thread diameter and the extension diameter adjacent to the hand wheel are relatively large. In the case of a conventional valve a packing run is located within the extension area, i.e., between the threads and the hand wheel. Therefore, a desire for a small sealing diameter and a large extension diameter are contradictory.

The present invention moves the packing run area of the stem to the opposite side of the threads, thus separating the stem into three different physical areas, i.e., an extension section, a threaded section and a sealing section. The present invention allows for the thread diameter and the extension diameter to be large while making the sealing diameter small. In the valve of the invention, the sealing diameter can be minimized to the point that it just exceeds the valve seat and maintains its function as a closing device.

One unexpected benefit associated with the new design is free turning action of the stem. As compared to conventional valves, the new valve turns much more freely, both at atmospheric condition and under pressure. The free turning action is believed to result from a relatively small diameter of the valve stem where the valve stem passes through the compression packing ring as compared to the diameter of the valve stem at this location in a conventional valve.

As the sealing diameter of a piston increases it takes a greater and greater force to drive it against pressure. In the present invention, the sealing diameter of the stem is in a section below the threads. Therefore, the sealing diameter of the stem may be minimized. A minimum sealing diameter of the stem is limited only by the need to seal against the seat. For example, a typical seat diameter for an instrument valve is 3/8". As an example, the sealing diameter of the stem in the valve of the invention may be 7/16", which is the minimum size required to seal over a 3/8" orifice. In contrast, the sealing diameter of the stem of a conventional valve is 5/8". The force required to drive a piston against pressure goes up in proportion to the cross sectional area of the piston, or by the diameter squared. Therefore, the valve of the invention requires a lower force to turn the stem against pressure by $(0.437/0.625)^2$ or about 50%.

The extension diameter of the stem, which is on the opposite side of the screw threads from the sealing portion of the stem, remains at 5/8" in the preferred *embodiment*. A 5/8" diameter is large enough to resist inadvertent twisting or bending of the *stem. The* screw thread diameter preferably remains relatively large to maintain a favorable helix *angle*.

One advantage of the valve of the present invention is that the packing area of the valve is moved from the outboard end of the stem to the inboard end of the stem. The unique placement of the packing area is accomplished by utilizing a dual acting, non-rotating bonnet. The use of a dual acting, non-rotating bonnet accomplishes a separation between possibly harmful fluids in the valve and the screw threads. Separation between the fluid and screw threads is desirable because the screw threads are susceptible to fouling and corrosion, which may render the valve inoperable.

While the invention is described primarily with respect to liquid level gage valves having an inlet passageway and an outlet passageway offset by 90°, and the like, it should be understood that the invention is equally applicable to other types of valves including, for example, in-line valves, and valves having parallel but axially offset inlet and outlet passageways.

Further objects, features, and advantages of the present invention will be apparent to those skilled in the art upon examining the accompanying drawings and upon reading the following detailed description of the preferred embodiments.

DETAILED DESCRIPTION OF THE PREFERRED EMBODIMENTS

Figure 2:
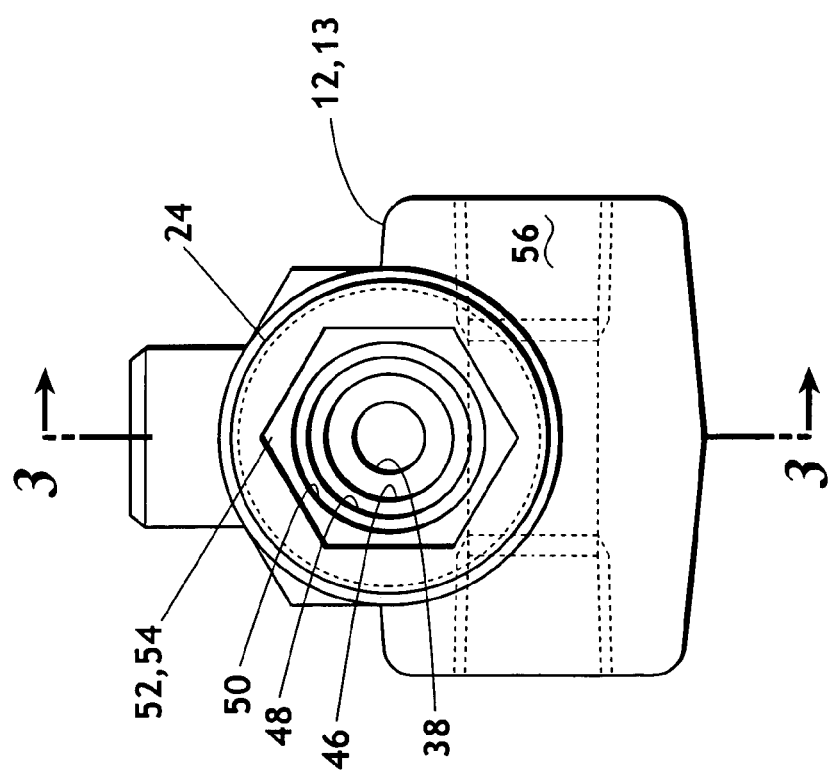
FIG. 2 is an end view of a first embodiment of the valve of the invention, showing the valve body only.
Figure 3:
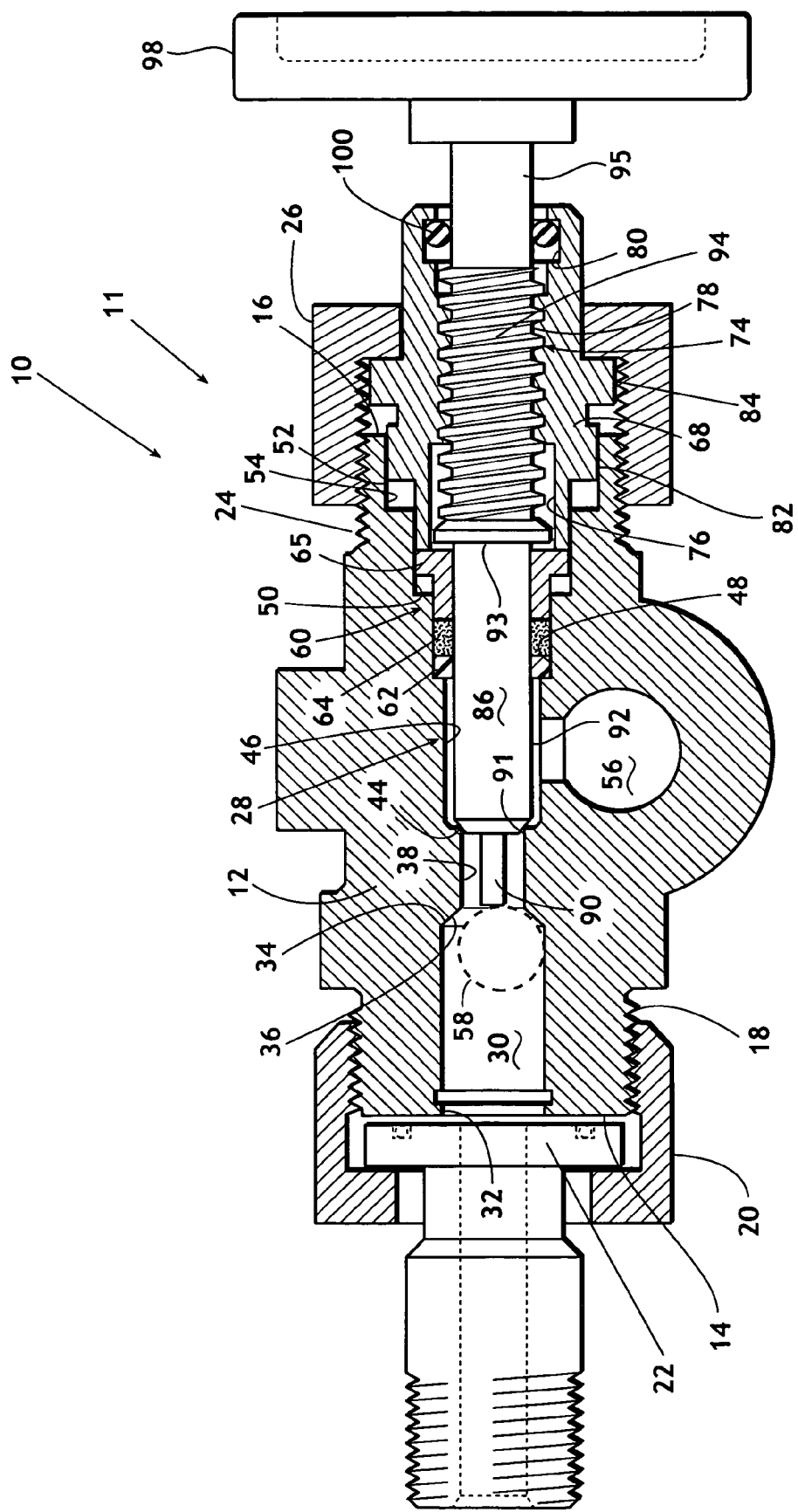
FIG. 3 is an assembly cross-sectional view of the first embodiment of an angle valve shown in FIG. 2, taken along line 3—3 of FIG. 2.

Referring now to FIGS. 1–5, shown is a valve designated generally 10. Referring in particular to FIGS. 2 and 3, a first embodiment 11 of valve 10 is shown. Valve 11 has a body 12 having a first end 14 and a second end 16. Body 12 comprises valve unit 13. First end 14 has external threads 18 formed thereon. External threads 18 preferably receive a union nut 20 that secures the body 12 to a vessel, e.g. vessel 15 (FIG. 1) by engaging a floating shank 22 (FIG. 3). Second end 16 of body 12 preferably has external threads 24 for receiving a bonnet nut 26.

Referring now primarily to FIG. 3, body 12 has a passageway 28 formed therein. Passageway 28 extends from first end 14 to second end 16 of body 12. First end 14 of passageway 28 is preferably the valve inlet. Passageway 28 defines a check ball chamber 30 in having a first end 32 and a second end 34. First end 32 of check ball chamber 30 communicates with first end 14 of body 12. Check ball chamber 30 preferably has a tapered check ball seat 36 at the second end 34 of the check ball chamber 30.

A restricted area 38 is located adjacent to check ball chamber 30. Restricted area 38 has a first end in communication with the seat 36 of the check ball chamber 30. Restricted area 38 additionally has a second end defining a sealing surface or seat 44. A stem receiving bore 46 is located adjacent to restricted area 38. A seal-receiving area 48 is located adjacent to the stem receiving bore 46.

A first bonnet receiving area 50 is adjacent to the seal-receiving area 48. A second bonnet receiving area 52 is located adjacent to the first bonnet receiving area 50. The second bonnet receiving area 52 is defined by a non-circular inner perimeter 54, which is preferably hexagonal although non-circular inner perimeter 54 may be octagonal, pentagonal, square, oval, splined or have another non-circular configuration. Additionally, the non-circular inner perimeter 54 may be substantially circular, but include recesses for receiving one or more keys.

An outlet passageway 56 (FIGS. 2, 3) is in communication with the stem receiving bore 46. Outlet passageway 56 is preferably offset from the passageway 28. Outlet passageway 56 is preferably oriented at an angle of 90° to the passageway 28, although other orientations of outlet passageway 56 with respect to passageway 28 are possible.

A check ball 58 is located in the check ball chamber 30. The check ball 58 is provided to seal against the tapered check ball seat 36 in the event of a rapid pressure loss through the outlet passageway 56.

A packing assembly 60 is located in the seal receiving area 48 of passageway 28. The packing assembly 60 has a packing washer 62 located proximate the stem receiving bore 46, packing member 64 and packing follower 65, which extends into the first bonnet receiving area 50. The packing follower 65 has a radial portion located in the first bonnet receiving area 50 of passageway 28.

A packing bonnet 68 has a first end that preferably communicates with the packing follower 65. Packing bonnet 68 defines a passageway 74 that is in axial alignment with passageway 28. The passageway 74 has an unthreaded portion 76 that is in communication with the first end of the packing bonnet 68. Unthreaded portion 76 of passageway 74 is located within the valve body 12 when valve 11 is assembled. A threaded portion 78 of the passageway 74 is adjacent to the unthreaded portion 76. An outer portion 80 of the passageway 74 is located adjacent to the threaded portion 78 and is in communication with the second end of the packing bonnet 68. The first end of the packing bonnet 68 is located in first bonnet receiving area 50 of passageway 28 when valve 11 is assembled.

The packing bonnet 68 has an external non-circular area 82 proximate the first end of the packing bonnet 68 for complementary engagement with the non-circular inner perimeter 54 of the second bonnet receiving area 52 of the valve body 12. The external non-circular area 82 of the packing bonnet 68 is preferably hexagonal but may be of any shape having a complementary engagement with non-circular inner perimeter 54 of valve body 12. The close mating relationship of the external non-circular area 82 of the packing bonnet 68 with the non-circular inner perimeter 54 of the valve body 12 prevents rotation of the packing bonnet 68 with respect to the valve body 12 since packing bonnet 68 preferably has an external flange member 84 provided for interfacing with an inside surface of bonnet nut 26. Additionally, external non-circular area 82 of packing bonnet 68 and non-circular inner perimeter 54 of seal bonnet receiving area 52 may be shaped to receive one or more keys to prevent relative rotation of the packing bonnet 68 with respect to the valve body 12.

Stem 86 is located within the passageway 28 of the valve body 12. The stem 86 passes through the passageway 74 of the packing bonnet 68. The stem 86 has a first end having a check ball displacement pin 90 extending therefrom. The check ball displacement pin 90 extends through the restricted area 38 of the valve body 12 for unseating the check ball 58 from the check ball seat 36 when the stem 86 is in a nearly fully closed position.

A tapered stem sealing surface 91 is provided for engaging the restricted area sealing surface or seat 44 of the valve body 12 when the stem 86 is in a fully closed position. An unthreaded portion 92 extends through the stem receiving bore 46 and also passes through the seal receiving area 48 of the valve body 12 for sealing engagement with packing member 64. In one embodiment, as shown in FIG. 3, a minimal clearance is provided between stem 86 and stem receiving bore 46. For example, stem 86 may have a diameter of 7/16" and stem receiving bore 46 may have a diameter of 9/16". A stem flange member 93 is adjacent to the unthreaded portion 92 and is located within the unthreaded portion 76 of the passageway 74 of the packing bonnet 68. A threaded portion 94 of the stem 86 is adjacent to the stem flange member 93. Threaded portion 94 of the stem 86 is provided for engaging the threaded portion 78 of the passageway 74 of the packing bonnet 68. An end portion 95 of the stem 86 is located adjacent to the threaded portion 94 and communicates with an external end of the stem 86. The external end of the stem 86 defines a threaded cavity therein for receiving a bolt to secure handwheel 98 to stem 86.

Bonnet nut 26 is threaded on external threads 24 on the second end 16 of the valve body 12. Bonnet nut 26 is provided to secure the packing bonnet 68 within the valve body 12. Preferably, a weather seal 100 is provided in the packing bonnet 68 for wiping engagement with the stem member 86. Seal 100 helps retain internal lubrication.

Figure 1:
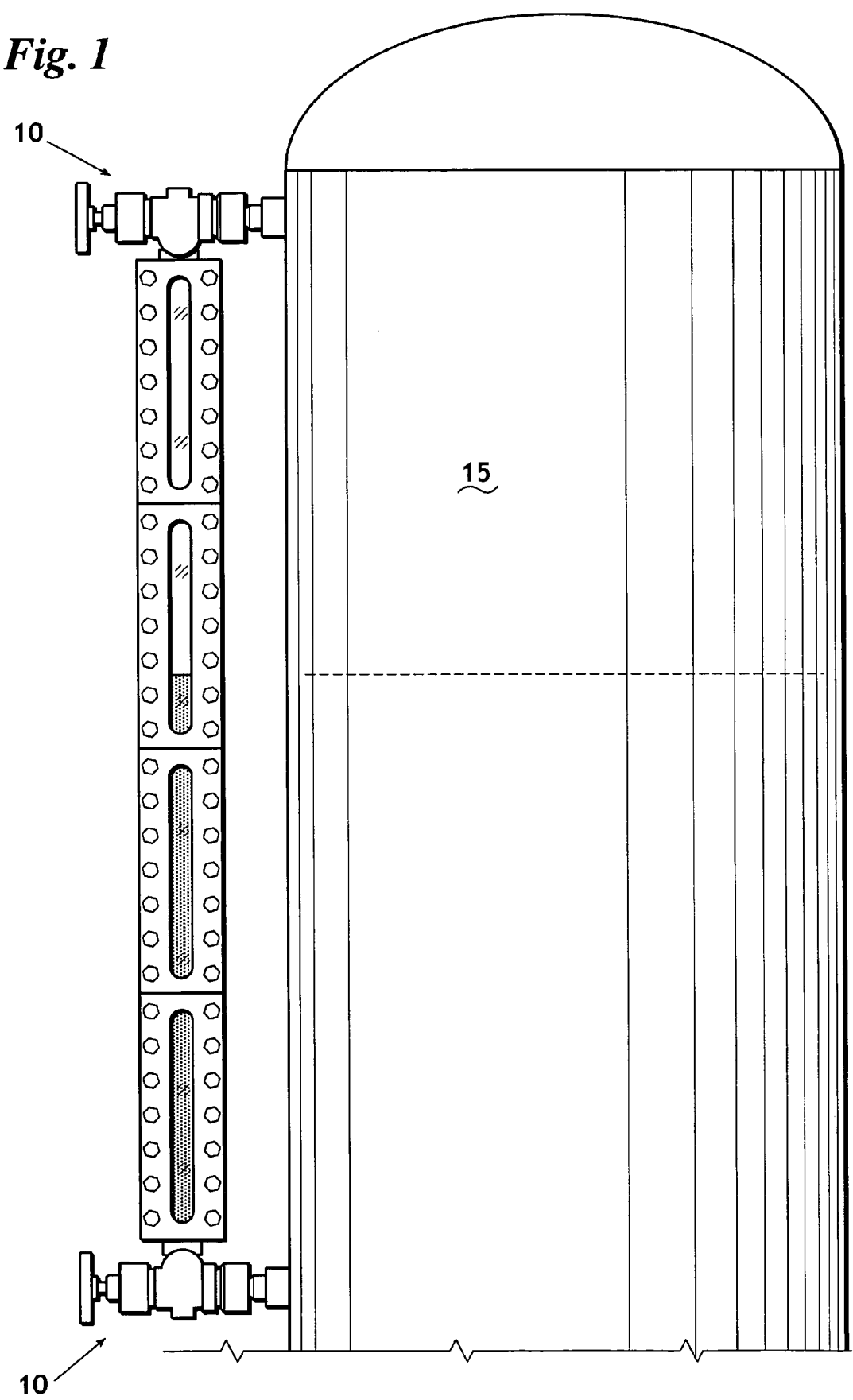
FIG. 1 is a schematic view of the valve of the invention used as a liquid level sight glass gauge valve.
Figure 4:
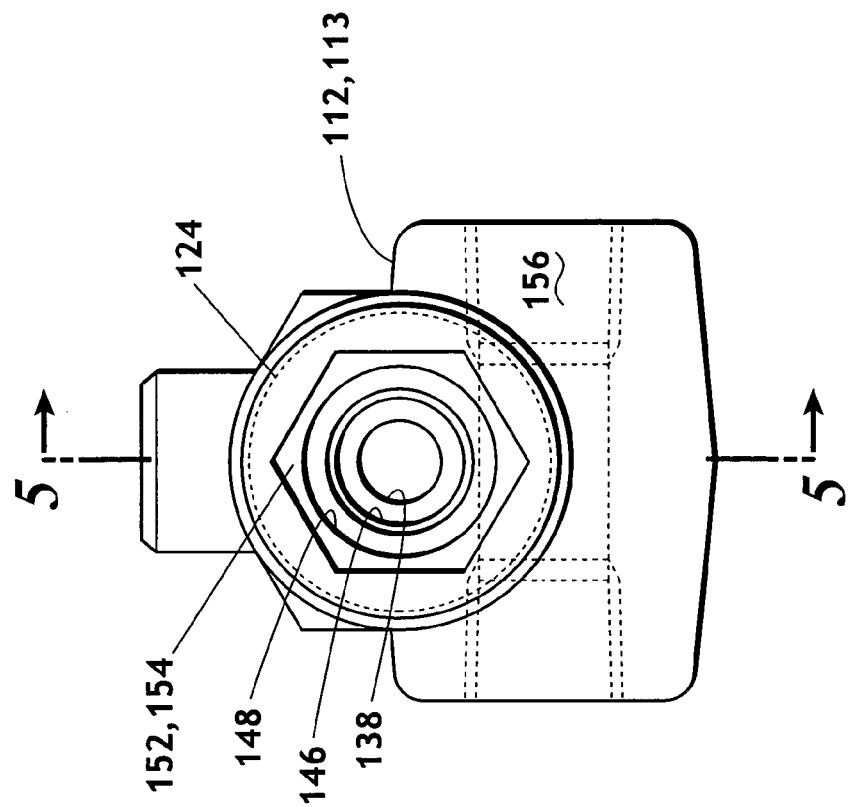
FIG. 4 is an end view of a second embodiment of an angle valve of the invention, showing the valve body only.
Figure 5:
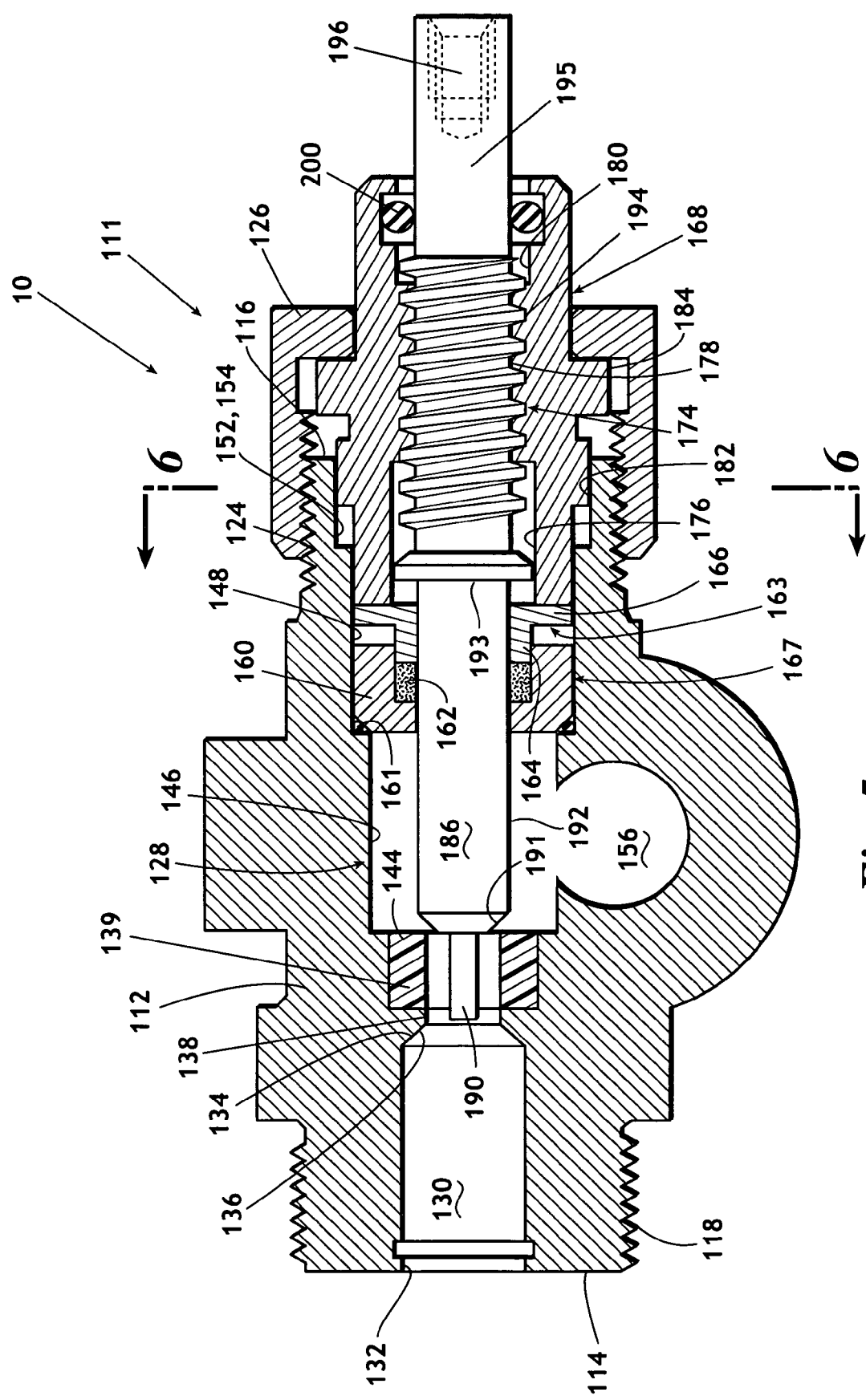
FIG. 5 is an assembly cross-sectional view of the valve shown in FIG. 4, taken along line 5—5 of FIG. 4.

Referring now to FIGS. 4 and 5, shown is a second embodiment 111 of a valve designated generally 111. Valve 110 has a body 112 having a first end 114 and a second end 116. Body 112 comprises valve unit 113. First end 114 has external threads 118 formed thereon. External threads 118 preferably receive a union nut (not shown) that secures the body 112 to a vessel, such as vessel 15 of FIG. 1. Second end 116 of body 112 preferably has external threads 124 for receiving a bonnet nut 126. Body 112 has a passageway 128 formed therein. Passageway 128 extends from first end 114 to second end 116 of body 112. The first end 114 of passageway 128 is preferably the valve inlet. Passageway 128 defines a check ball chamber 130 in having a first end 132 and a second end 134. First end 132 of check ball chamber 130 communicates with first end 114 of body 112. Check ball chamber 130 preferably has a tapered check ball seat 136 at the second end 134 of the check ball chamber 130.

A restricted area 138 is located adjacent to check ball chamber 130. Restricted area 138 has a first end in communication with the seat 136 of the check ball chamber 130. Restricted area 138 additionally has a second end defining a renewable seat receiving area 139. Seat 144 may be threadably secured within seat receiving area 139 or may be secured by other means. A large stem receiving bore 146 is located adjacent to seat receiving area 139 to accommodate installation and removal of screw-in renewable seat 144. Renewable seat receiving area 139 is preferably threaded to threadably engage the screw-in renewable seat 144. A seal-receiving area 148 is located adjacent to the large stem receiving bore 146.

Figure 6B:
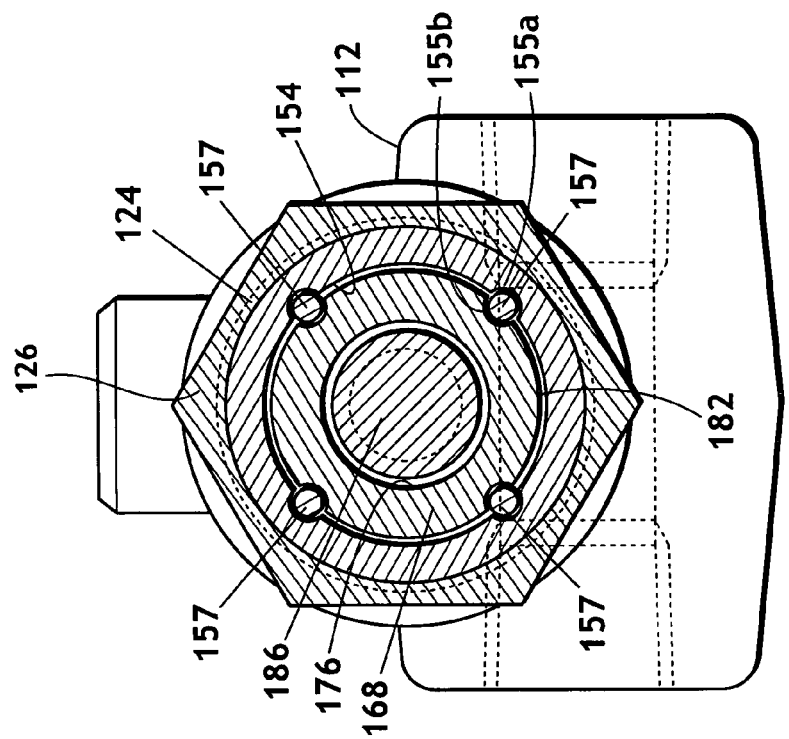
FIG. 6b is a cross-sectional view of an alternate embodiment of the valve.
Figure 6A:
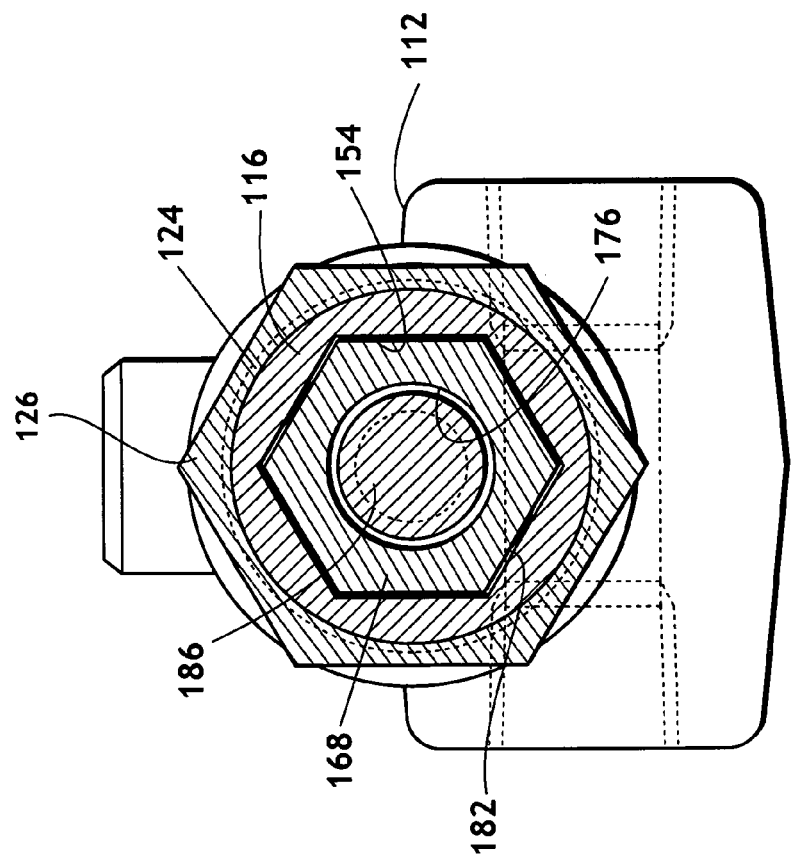
FIG. 6a is a cross-sectional view taken along line 6—6 of FIG. 5.

An unthreaded bonnet receiving area 152 is located adjacent to the seal-receiving area 148. The unthreaded bonnet receiving area 152 is defined by a non-circular inner perimeter 154, which is preferably hexagonal (FIG. 6a) although non-circular inner perimeter 154 may be octagonal, pentagonal, square, oval or have another non-circular configuration. Additionally, the non-circular inner perimeter 154 may be substantially circular but include recesses 155a, which may be positioned opposite corresponding recesses 155b formed in external non-circular area 182 of packing bonnet 168 (FIG. 6b) for receiving keys 157. Although the keyed feature is shown in use with the embodiment labeled valve 111, it should be understood that the keyed feature may be used on the valve embodiment labeled 11 or on other embodiments within the scope of the invention.

An outlet passageway 156 is in communication with the large stem receiving bore 146. Outlet passageway 156 is preferably offset from the passageway 128. Outlet passageway 156 is preferably oriented at an angle of 90° to the passageway 128, although other orientations of outlet passageway 156 with respect to passageway 128 are possible.

A check ball (not shown) may be located in the check ball chamber 130. The check ball is provided to seal against the tapered check ball seat 136 in the event of a rapid pressure loss through the outlet passageway 156.

A carrier ring 160 is located in the seal receiving area 148 of passageway 128. Carrier ring 160 is preferably received within seal receiving area 148. A seal 161, such as an O-ring, may be provided between the wall of threaded seal receiving area 148 and the outside surface of carrier ring 160. Seal 161 may also be positioned on the bottom face of the carrier ring, preferably adjacent a chamfered surface on a first end of the carrier ring 160. A packing member 162 is preferably received within carrier ring 160. A packing follower 163 is provided adjacent packing member 162. Packing follower 163 has an axial portion 164 located proximate the packing member 162. The packing follower 163 has a radial portion 166 located in the seal receiving area 148 of passageway 128. The carrier ring 160, packing member 162 and packing follower 163, are referred to collectively as the packing assembly 167.

A packing bonnet 168 has a first end that preferably bears against the packing follower 163. Packing bonnet 168 defines a passageway 174 that is in axial alignment with passageway 128. The passageway 174 has an unthreaded portion 176 that is in communication with the first end of the packing bonnet 168. The unthreaded portion 176 of passageway 174 is located within the valve body 112 when valve 111 is assembled. A threaded portion 178 of the passageway 174 is adjacent to the unthreaded portion 176. An outer portion 180 of the passageway 174 is located adjacent to the threaded portion 178 and is in communication with the second end of the packing bonnet 168. The first end of the packing bonnet 168 is located in the seal-receiving area 148 of passageway 128 when valve 111 is assembled.

The packing bonnet 168 has an external non-circular area 182 proximate the first end of the packing bonnet 168 for complementary engagement with the non-circular inner perimeter 154 of the unthreaded bonnet receiving area 152 of the valve body 112. The external non-circular area 182 of the packing bonnet 168 is preferably hexagonal but may be of any shape designed for complementary engagement with non-circular inner perimeter 154 of valve body 112. Packing bonnet 168 may also be keyed to the valve body 112. The close mating relationship of the external non-circular area 182 of the packing bonnet with the non-circular inner perimeter 154 of the valve body 112 prevents rotation of the packing bonnet 168 with respect to the valve body 112. The packing bonnet 168 preferably has an external flange member 184 provided for interfacing with an inside surface of a bonnet nut (FIG. 5). Additionally, non-circular inner perimeter 154 may include a configuration including recesses 155a for receiving one or more keys 157.

Stem 186 is located within the passageway 128 of the valve body 112. The stem 186 passes through the passageway 174 of the packing bonnet 168. The stem 186 has a first end having a check ball displacement pin 190 extending therefrom. The check ball displacement pin 190 extends through the restricted area 138 of the valve body 112 for unseating the check ball (not shown) from the check ball seat 136 when the stem 186 is in a nearly fully closed position.

A tapered stem sealing surface 191 is provided for engaging the renewable seat 144 when the stem 186 is in fully closed position. An unthreaded portion 192 extends through the stem receiving bore 146 and also passes through the seal receiving area 148 of the valve body 112 where the stem is in sealing engagement with packing assembly 167. In one embodiment, a substantial clearance is provided between stem 186 and stem receiving bore 146. For example, stem 186 may have a diameter of 7/16" and stem receiving bore 146 may have a diameter of 15/16". A stem flange member 193 is adjacent to the unthreaded portion 192 and is located within the unthreaded portion 176 of the passageway 174 of the packing bonnet 168. A threaded portion 194 of the stem 186 is adjacent to the stem flange member 193. Threaded portion 194 of the stem 186 is provided for engaging the threaded portion 178 of the passageway 174 of the packing bonnet 168. An end portion 195 of the stem 186 is located adjacent to the threaded portion 194 and communicates with an external end of the stem 186. The external end of the stem 186 defines a threaded cavity 196 therein for receiving a bolt to secure a handwheel (not shown) to stem 186.

Bonnet nut 126 is threaded on external threads 124 on the second end 116 of the valve body 112. Bonnet nut 126 is provided to secure the packing bonnet 168 within the valve body 112. Preferably, a weather seal or stem seal 200 is provided in the packing bonnet 168 for wiping engagement with the stem 186. Seal 200 helps retain internal lubrication.

Figure 7:
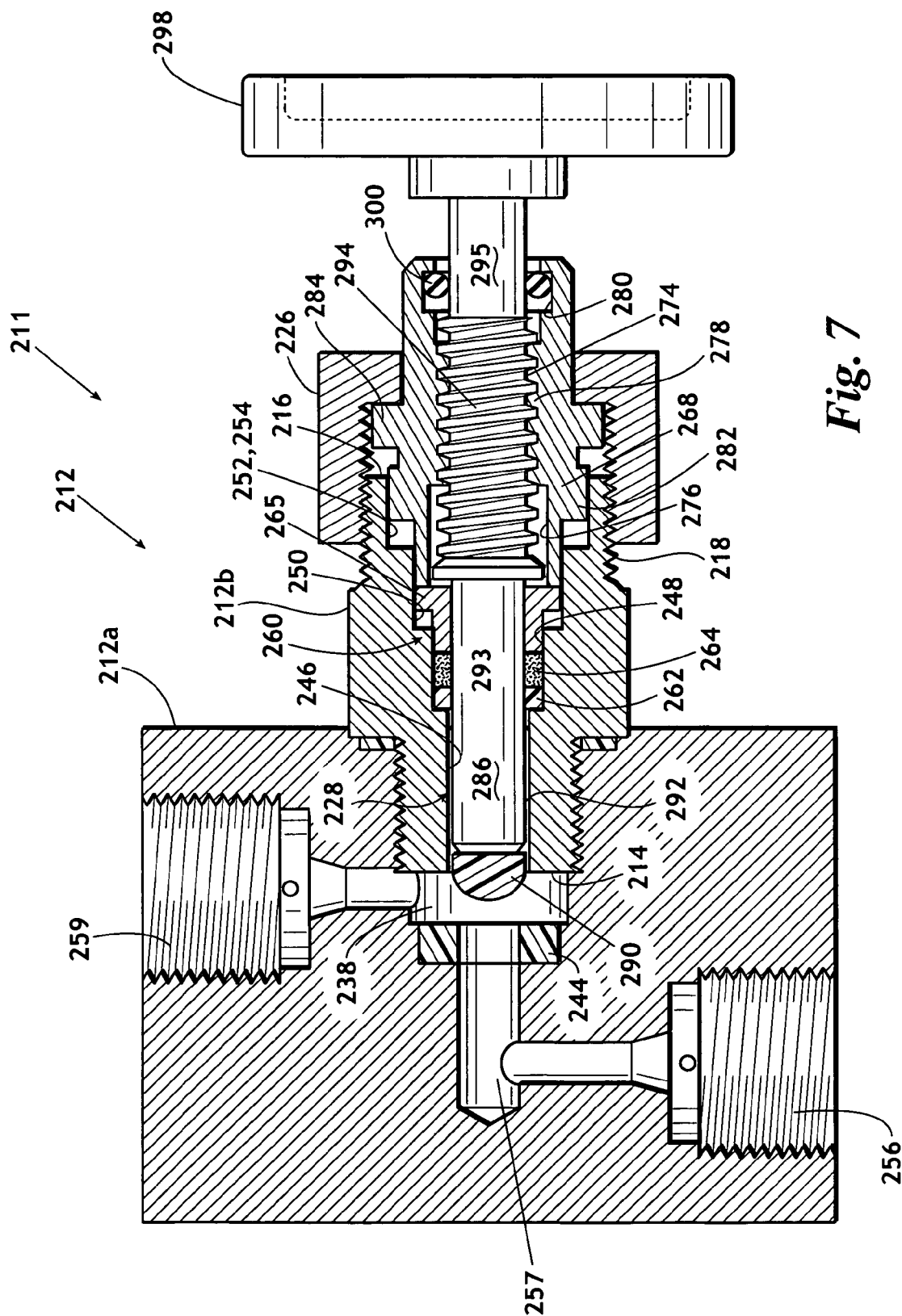
FIG. 7 is an assembly cross-sectional view of an straight pattern valve configuration of the invention.

Referring now primarily to FIG. 7, a further embodiment 211 of the valve is shown. Embodiment 211 has a valve unit 212 comprising body 212a and attachment piece 212b. Attachment piece 212b has a passageway 228 formed therein. Passageway 228 extends from first end 214 to second end 216 of attachment piece 212b. Second end 216 is preferably provided with external threads 218.

A chamber 238 is located adjacent to first end 214. Chamber 238 defines a sealing surface or seat 244. A stem receiving bore 246 communicates with first end 214. A seal-receiving area 248 is located adjacent to the stem receiving bore 246.

A first bonnet receiving area 250 is adjacent to the seal-receiving area 248. A second bonnet receiving area 252 is located adjacent to the first bonnet receiving area 250. The second bonnet receiving area 252 is defined by a non-circular inner perimeter 254, which is preferably hexagonal although non-circular inner perimeter 254 may be octagonal, pentagonal, square, oval, splined or have another non-circular configuration. Additionally, the non-circular inner perimeter 254 may be substantially circular, but include recesses for receiving one or more keys.

An outlet passageway 256 communicates with the chamber 238 via chamber passageway 257. Outlet passageway 256 may be offset from or in-line with inlet passageway 259. Although inlet passageway 259 is shown oriented at a 90° angle with respect to passageway 228, it should be understood that inlet passageway 259 may be in-line with passageway 228, as shown in valve embodiments 11, 111, above, or may be oriented at any suitable angle with respect to passageway 228. Outlet passageway 256 is preferably oriented at an angle of 90° to passageway 228, although other orientations of outlet passageway 256 with respect to passageway 228 are possible.

A packing assembly 260 is located in the seal receiving area 248 of passageway 228. The packing assembly 260 has a packing washer 262 located proximate the stem receiving bore 246, packing member 264 and packing follower 265, which extends into the first bonnet receiving area 250. The packing follower 265 has a radial portion located in the first bonnet receiving area 250 of passageway 228.

A packing bonnet 268 has a first end that preferably communicates with the packing follower 265. Packing bonnet 268 defines a passageway 274 that is in axial alignment with passageway 228. The passageway 274 has an unthreaded portion 276 that is in communication with the first end of the packing bonnet 268. Unthreaded portion 276 of passageway 274 is located within the valve body 212 when valve 211 is assembled. A threaded portion 278 of the passageway 274 is adjacent to the unthreaded portion 276. An outer portion 280 of the passageway 274 is located adjacent to the threaded portion 278 and is in communication with the second end of the packing bonnet 268. The first end of the packing bonnet 268 is located in first bonnet receiving area 250 of passageway 228 when valve 211 is assembled.

The packing bonnet 268 has an external non-circular area 282 proximate the first end of the packing bonnet 268 for complementary engagement with the non-circular inner perimeter 254 of the second bonnet receiving area 252 of the attachment piece 212b of valve unit 212. The external non-circular area 282 of the packing bonnet 268 is preferably hexagonal but may be of any shape having a complementary engagement with non-circular inner perimeter 254 of attachment piece 212b of valve unit 212. The close mating relationship of the external non-circular area 282 of the packing bonnet 268 with the non-circular inner perimeter 254 of the attachment piece 212b prevents rotation of the packing bonnet 268 with respect to the attachment piece 212b since packing bonnet 268 preferably has an external flange member 284 provided for interfacing with an inside surface of bonnet nut 226. Additionally, external non-circular area 282 of packing bonnet 268 and non-circular inner perimeter 254 of seal bonnet receiving area 252 may be shaped to receive one or more keys to prevent relative rotation of the packing bonnet 268 with respect to the attachment piece 212b.

Stem 286 is located within the passageway 228 of the attachment piece 212b. The stem 286 passes through the passageway 274 of the packing bonnet 268. The stem 286 has a first end having a sealing area 290 located thereon.

The sealing area 290 is provided for engaging seat 244 of the valve body 212a of valve unit 212 when the stem 286 is in a fully closed position. An unthreaded portion 292 extends through the stem receiving bore 246 and also passes through the seal receiving area 248 of the attachment piece 212b of valve unit 212 for sealing engagement with packing member 264. A stem flange member 293 is adjacent to the unthreaded portion 292 and is located within the unthreaded portion 276 of the passageway 274 of the packing bonnet 268. A threaded portion 294 of the stem 286 is adjacent to the stem flange member 293. Threaded portion 294 of the stem 286 is provided for engaging the threaded portion 278 of the passageway 274 of the packing bonnet 268. An end portion 295 of the stem 286 is located adjacent to the threaded portion 294 and communicates with an external end of the stem 286. The external end of the stem 286 defines a threaded cavity therein for receiving a bolt to secure handwheel 298 to stem 286.

Bonnet nut 226 is threaded on external threads 218 on the second end 216 of the valve unit 212. Bonnet nut 226 is provided to secure the packing bonnet 268 within the attachment piece 212b valve unit 212. Preferably, a weather seal 300 is provided in the packing bonnet 268 for wiping engagement with the stem member 286. Seal 300 helps retain internal lubrication.

In use, valves 11, 111, 211 of the invention are used to selectively open or close a fluid path from first end or inlet 14, 114, 259 of the valve to outlet passageway 56, 156, 256. By rotating handwheel 98, 298 (FIGS. 3 and 7), stem 86, 186, 286 is axially displaced by interaction of threaded portion 94, 194, 294 of stem 86, 186, 286 with threaded portion 78, 178, 278 of passageway 74, 174, 274. Depending on the direction of rotation of stem 86, 186, 286 tapered stem sealing surface or sealing area 91, 191, 290 moves towards or away from sealing surface 44, 244 (FIGS. 3 and 7) or renewable seat 144 (FIG. 5). When the tapered stem sealing surface or sealing area 91, 191, 290 is engaging sealing surface or seat area 44, 244 or renewable seat 144, the valve is in a closed state.

When the tapered stem sealing surface or sealing area 91, 191, 290 is disengaged from the seat area 44, 144, 244 the valve is in an opened state. When valve 11, 111, 211 is in an opened state, fluid may migrate from first end or inlet 14, 144, 259 through check ball chamber or chamber 30, 130, 238 through restricted area 38, 138, and into stem receiving bore 46, 146 before exiting out through outlet passageway 56, 156 of the valve. Alternatively, embodiment 211 (FIG. 7) selectively allows fluid to pass from inlet 259 to outlet 256 by selectively engaging or disengaging sealing area 290 with sealing surface 244. In all embodiments 11, 111, 211, packing assembly 60, 167, 260 sealingly engages the stem 86, 186, 286 which prevents fluid migration from the stem receiving bore 46, 146, 246 into contact with threaded portion 94, 194, 294 of stem 86, 186, 286.

To adjust compression on packing assembly 60, 167, 260 bonnet nut 26, 126, 226 (FIGS. 3, 5 and 7) is rotatably adjusted. Bonnet nut 26, 126, 226 acts on external flange member 84, 184, 284 of packing bonnet 68, 168, 268 to press packing bonnet 68, 168, 268 into packing assembly 60, 167, 260 by a desired amount.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A valve comprising:
a valve unit;
a passageway in said valve unit, said passageway defining a seat, a seal receiving area and a non-circular inside surface;
an inlet passageway in communication with said passageway;
an outlet passageway in communication with said passageway;
a packing assembly in said seal receiving area of said passageway;
a bonnet having a first end and a second end, said bonnet having an internally threaded area and a non-circular exterior area for complementary engagement with said non-circular inside surface of said passageway of said valve unit, said first end of said bonnet for engaging said packing assembly; and
a valve stem in said passageway in sealing relationship with an inside surface of said packing assembly, said valve stem threadably engaged with said internally threaded area of said bonnet for selectively sealing against said seat.

2. The valve according to claim 1 wherein:
said valve stem selectively engages a replaceable seat.

3. The valve according to claim 2 wherein:
said replaceable seat is threadably received within said passageway.

4. The valve according to claim 2 wherein:
said replaceable seat is a press-in seat received within said passageway.

5. The valve according to claim 1 wherein:
said passageway comprises a bonnet receiving area, wherein said seal receiving area and said bonnet receiving area have equivalent inner diameters; and
further comprising a carrier ring in said seal receiving area, said carrier ring having an inner diameter for receiving a packing member.

6. The valve according to claim 1 wherein:
said passageway extends from a first end to a second end of said valve unit, wherein said passageway comprises an inlet at said first end of said valve unit; and
said outlet passageway communicates with said passageway between said seat and said seal receiving area.

7. The valve according to claim 1 wherein:
said outlet passageway is perpendicular to said inlet passageway.

8. The valve according to claim 1 wherein:
said outlet passageway is parallel to said inlet passageway.

9. The valve according to claim 1 wherein:
a longitudinal axis of said outlet passageway is offset from a longitudinal axis of said passageway.

10. The valve according to claim 1 wherein:
said non-circular inside surface of said passageway is hexagonal; and
said non-circular exterior area of said bonnet is hexagonal.

11. The valve according to claim 1 wherein:
said non-circular inside surface of said passageway partially defines a key receptacle;
said non-circular exterior area of said bonnet partially defines a key receptacle; and further comprising:
a key received with said key receptacle defined by said non-circular inside surface of said passageway and by said non-circular exterior area of said bonnet for preventing relative rotation between said bonnet and said valve unit.

12. The valve according to claim 1 wherein:
said first end of said bonnet engages said packing assembly.

13. The valve according to claim 1 further comprising:
external threads formed on a second end of said valve unit; and
a bonnet nut threadably received on external threads of said second end of said valve unit, said bonnet nut for securing said bonnet in said valve unit.

14. The valve according to claim 13 wherein:
said bonnet nut engages an external flange member of said bonnet for selectively axially displacing said bonnet within said valve unit.

15. The valve according to claim 1 wherein said packing assembly further comprises:
a carrier ring; wherein
a first end of said carrier ring has chamfered surface around a perimeter of said first end; and
an O-ring located in a space defined by said chamfered surface and said seal receiving area of said valve unit.

16. The valve according to claim 1 wherein:
said valve stem having a threaded section, a sealing section, and a sealing surface;
said packing assembly for sealing engagement with said sealing section of said valve stem;

wherein said sealing surface of said valve stem for selectively sealing against said valve seat is on a first side of said packing assembly; and
wherein said threaded section of said valve stem is on a second side of said packing assembly.

17. A valve comprising:
a valve unit having a first end and a second end;
a passageway extending within said valve unit from said second end, said passageway defining a seat, a seal receiving area and a non-circular inside surface;
an outlet passageway in communication with said passageway;
a packing assembly in said seal receiving area of said passageway;
a bonnet having a first end and a second end, said bonnet having an internally threaded area and a non-circular exterior area for complementary engagement with said non-circular inside surface of said passageway of said valve. unit, said first end of said bonnet for engaging said packing assembly; and
a valve stem in said passageway in sealing relationship with an inside surface of said packing assembly, said valve stem threadably engaged with said internally threaded area of said bonnet for selectively sealing against said seat.

* * * * *

UNITED STATES PATENT AND TRADEMARK OFFICE
CERTIFICATE OF CORRECTION

PATENT NO.       : 6,991,216 B1                                         Page 1 of 1
APPLICATION NO.  : 10/460542
DATED            : January 31, 2006
INVENTOR(S)      : Steve B. Wilson It is certified that error appears in the above-identified patent and that said Letters Patent is hereby corrected as shown below:

On title page, item 56 References Cited
  replace "Strahman Vales, Inc., Liquid Level Gauges."
  with --Strahman Valves, Inc., Liquid Level Gauges.--.

In the drawings, Sheet 4, Figure 5
  replace "10"
  with --110--.

Col. 7, line 44
  replace "110"
  with --111--.

Col. 11, line 41
  replace "144"
  with --114--.

Signed and Sealed this

Fifteenth Day of August, 2006

JON W. DUDAS
*Director of the United States Patent and Trademark Office*